SAMUEL O. HIGGASON.
Improvement in Bee-Hives.

No. 126,055.   Patented April 23, 1872.

Witnesses
Jno. A. Ellis.
Wm. K. Ellis

Inventor
Samuel O. Higgason
Per.
T. H. Alexander
Atty.

UNITED STATES PATENT OFFICE.

SAMUEL O. HIGGASON, OF UNION CITY, TENNESSEE.

IMPROVEMENT IN BEE-HIVES.

Specification forming part of Letters Patent No. 126,055, dated April 23, 1872.

SPECIFICATION.

*To all whom it may concern:*

Be it known that I, S. O. HIGGASON, of Union City, in the county of Obion and State of Tennessee, have invented certain new and useful Improvements in Bee-Hives; and I do hereby declare that the following is a full, clear, and exact description thereof, reference being had to the accompanying drawing and to the letters of reference marked thereon, which form a part of this specification.

The nature of my invention consists in the construction and arrangement of a "bee-hive," as will be hereinafter more fully set forth.

In order to enable others skilled in the art to which my invention appertains to make and use the same, I will now proceed to describe its construction and operation, referring to the annexed drawing, in which—

Figure 1:
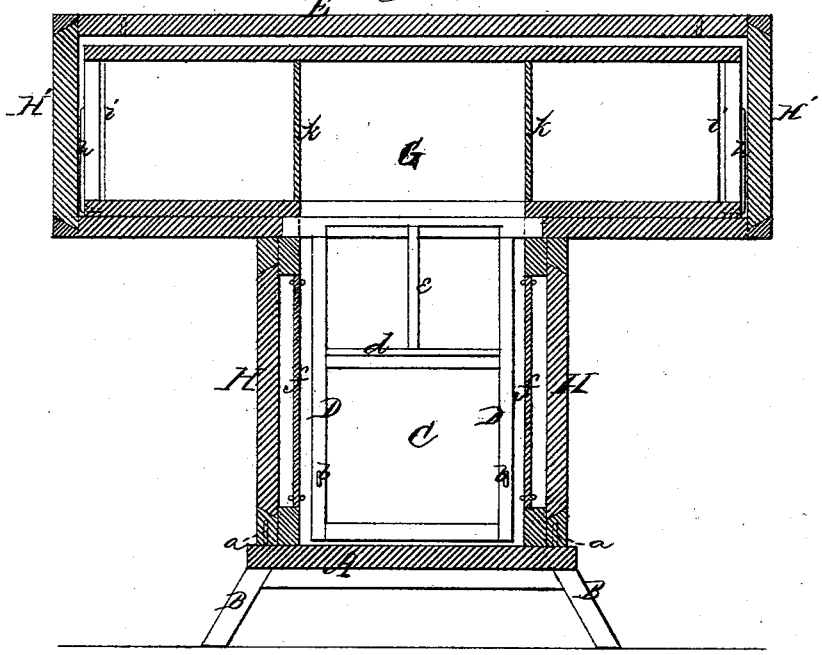
Figure 2:
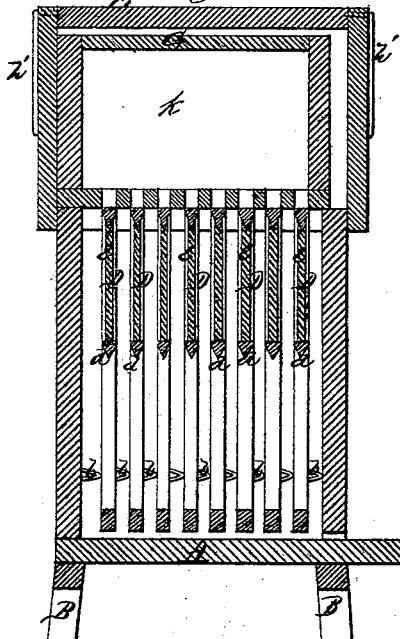

Figure 1 represents a longitudinal vertical section, and Fig. 2 is a cross-section of my bee-hive.

A represents a stand of suitable dimensions resting upon feet B B. This stand forms the bottom board of the hive, upon which the hive stands, it being fastened by dowel-pins $a\ a$, to prevent it being moved out of place in handling, and it can be raised in warm weather to give the bees air. The brood-chamber C, which is the lower part of the hive, is provided with deep frames D D to prevent the bees from rearing brood above in the honey-box. The top of the brood-chamber forms the bottom of the honey-chamber E above and extends a suitable distance on both sides beyond the brood-chamber. This top (or bottom of honey-chamber) has an opening in the center corresponding with the size of the entire brood-chamber. The frames D D are confined in grooves at the top, so that they cannot be moved out of their right places in handling or moving the hive or moving the honey-box in and out of the hive, and they are braced below with wire braces $b\ b$, to keep them from swinging together at the bottom when handling or tilting the hive. These frames are braced by a horizontal brace, $d$, and the upper part of the thereby-divided frame by a perpendicular brace, $e$. The horizontal brace $d$ divides the large sheet of honey one way to prevent its falling in warm weather, and it also keeps the frame from springing at the sides.

The perpendicular brace $e$ divides the upper part of the comb, which always contains the honey, which is so heavy that it sometimes gives way in warm weather. These braces also answer for another purpose, namely: Bees, when building comb, always leave openings at the edges and bottom where the combs are joined. These openings are valuable to the bees in their work, and answer for passages through the honey in cold weather, and, the frames being braced both ways, these passages will not be changed or altered from their right shape in handling or removing honey. Both sides of the hive have observing-glass $f$ and slide-doors H, so that the condition of the bees can be ascertained at any time without interruption to the bees. G represents the honey-box, which rests directly on the frames D D and parallel with the same, and is provided with openings in the bottom to correspond exactly with the openings between the frames, so that the bees may enter from any part of the top of the frames into the honey-box without crossing any air-space. The bottom of the honey-box G is held in place by hooks $h\ h$, and in the sides are grooves $i\ i$ for the insertion of glass $k\ k$. The top of the honey-chamber E, or upper part of the hive, is held by similar hooks, $h'\ h'$.

By pushing the honey-box G to the back part of the honey-chamber E the bees are cut off from entering the honey-box, as the openings in the same will then be directly opposite and against the frames, the box being made just so much narrower than the chamber in which it is placed. By this means the bees are hived into the brood-chamber, and, when they have built their combs in the frames, the honey-box may then be pushed to the front of the hive, making the brood-chamber and honey-box but one apartment, the bees passing between the combs, from one to the other, without any obstruction whatever.

This hive is a "swarmer" or "non-swarmer," as desired. By moving both glasses $k\ k$ in the honey-box to the center grooves the space is so diminished that the bees will swarm for the want of space, and, by placing both glasses in the grooves at the ends of the box, the space is so enlarged that the bees will not swarm for the reason that they have more space than they can fill, and being all in one apartment.

The honey-box G is also a suitable vessel for shipping honey to market in its combs as the bees have made it. The box may be lifted out at the top or drawn out at either end by moving the slide-doors H', and, by turning bottom side up and turning off the hooks $h\ h$ at the ends, the bottom may be lifted off, which makes a lid, and may be set away and the honey used in its natural state.

The proportions of this hive may of course be varied to suit the circumstances; but I have found the following to be about right: The brood-chamber fourteen by sixteen inches square and sixteen inches high, the top box three feet long and in proportion with the width of the brood-chamber, and the honey-box eight inches deep and fourteen inches wide.

Having thus fully described my invention, what I claim as new, and desire to secure by Letters Patent, is—

The arrangement of the chamber E and honey-box G as shown and described, so that by the mere movement of the honey-box backward the passages from the brood-chamber to the honey-box may be shut off, substantially as and for the purposes herein set forth.

In testimony that I claim the foregoing as my own I affix my signature in presence of two witnesses.

SAMUEL O. HIGGASON.

Witnesses:
SAML. T. EVANS,
R. A. PIERCE.